(12) United States Patent
Cunningham et al.

(10) Patent No.: US 6,378,131 B2
(45) Date of Patent: Apr. 23, 2002

(54) LOCAL UPSTREAM HUB FOR ONE-WAY CABLE SYSTEM DATA/VIDEO/SERVICES REQUESTS

(75) Inventors: Kenneth Cunningham, Hamilton; Joseph Smallcomb, Herndon; Ray Allen Daniel, Leesburg, all of VA (US)

(73) Assignee: ITT Manufacturing Enterprises, Inc., Wilmington, DE (US)

(*) Notice: Subject to any disclaimer, the term of this patent is extended or adjusted under 35 U.S.C. 154(b) by 0 days.

(21) Appl. No.: 08/864,408

(22) Filed: May 28, 1997

Related U.S. Application Data

(63) Continuation-in-part of application No. 08/749,700, filed on Nov. 15, 1996, now abandoned.

(51) Int. Cl.[7] ............................................... H04N 7/173
(52) U.S. Cl. ........................ 725/120; 725/119; 725/123
(58) Field of Search ...................... 455/15, 5.1; 348/12, 348/13, 7; 709/217–219; 725/63, 64, 65, 68, 118, 119, 120, 121, 123

(56) References Cited

U.S. PATENT DOCUMENTS

| | | | | |
|---|---|---|---|---|
| 5,093,718 A | * | 3/1992 | Hoarty et al. | 348/7 |
| 5,528,582 A | * | 6/1996 | Bodeep et al. | 370/24 |
| 5,550,578 A | * | 8/1996 | Hoarty et al. | 348/7 |
| 5,642,155 A | * | 6/1997 | Cheng | 348/12 |
| 5,812,184 A | * | 9/1998 | Martinez | 348/12 |
| 5,918,156 A | * | 6/1999 | Tanabe | 455/12.1 |
| 5,991,596 A | * | 11/1999 | Cunningham et al. | 455/12.1 |
| 6,078,950 A | * | 6/2000 | Hiedemann et al. | 709/217 |

* cited by examiner

Primary Examiner—John W. Miller
(74) Attorney, Agent, or Firm—Jim Zegeer

(57) ABSTRACT

Most cable television systems in the United States (over 75% as of this application) are structured for one-way only service between the cable headend and the user. With more and more services being introduced that require a two-way connection with the user (e.g. impulse-pay-per-view, home shopping, Internet access), it has become necessary for more and more cable systems to upgrade to a two-way capability at considerable cost and over a fairly long period of time. The typical short-term solution to the lack of two-way capability is to send request backlinks over he user's telephone line. The problem with this solution is that when used, it ties up the telephone line and requires an additional telephone connection to be located near the cable set-top-box or modem. A more practical solution is the hub centered backhaul invention described herein. With this invention, users can operate their cable systems as if they were two-way systems, with all available interactive capabilities available. The request channel, however, will be intercepted at a central location between multiple users, and returned to the cable headend via an alternate communication path. The backlink request will be intercepted at a location in the cable distribution prior to hardware that precludes two-way transmissions, such as amplifiers.

2 Claims, 6 Drawing Sheets

LOCAL UPSTREAM HUB FOR ONE-WAY CABLE SYSTEM DATA/VIDEO/SERVICES REQUESTS

This application is a continuation-in-part application of our application Ser. No. 08/749,700 filed Nov. 15, 1996, now abandoned, entitled LOCAL UPSTREAM HUB FOR ONE-WAY CABLE SYSTEM DATA/VIDEO/SERVICES REQUESTS.

TECHNICAL FIELD

This invention relates to an interactive cable broadcast network and a system to request data/video/services from a cable provider.

BACKGROUND OF THE INVENTION

Cable television systems have been installed throughout the world since the 1950's, and the popularity of the services is continually increasing. With over 11,000 cable systems in the United States that pass by 95% of all dwellings and have a subscriber penetration of 63%, there are over 60 million households that are connected and subscribe to cable TV. Cable television was initially designed to transport a large bandwidth of video information from a central headend to a large community of users. The cable system consists of five basic units: (1) the cable headend (the signal reception, origination, and modulation point); (2) the main, coaxial trunk (or tree) cable that runs through central streets in communities; (3) the coaxial distribution (branch) cable to the customer's neighborhood, including distribution taps; (4) subscriber drops to the house; and (5) subscriber terminal equipment (television, converter, VCR, etc.)

Interactive multimedia services are also on the rise with such applications as impulse-pay-per-view (for movies and sports events), home shopping, and Internet access now available to home and business users. Newer cable systems are being designed and implemented with two-way capability in which a section of the cable bandwidth has been allocated for upstream (i.e. user to cable provider) transmission. However, over 75% of the 11,000 or so cable systems in the United States are only capable of one-way service, and the new interactive options require an alternate upstream request backlink channel in order to make requests for data/video/services.

Currently, new cable systems are being deployed with a two-way capability built into their infrastructure, and most of the older cable systems with one-way only are making long range plans for upgrading to a two-way capability. However, the upgrade is expensive and is expected to take five to ten years to complete. The primary means of making an upstream request is by connecting the cable set-top-box or cable modem to a telephone line and dialing out to the cable provider. The problem with this setup is that it ties up the user's telephone line when interactive services are needed and that the cable provider is required to maintain a bank of telephone lines to accommodate all of the users that simultaneously utilize an interactive service.

THE PRESENT INVENTION

The objective of this invention is to provide an alternate communication path for the upstream request channel for one-way cable systems that will alleviate the need for a telephone connection at the subscriber's location and also lessen the immediacy to upgrade to a two-way capability. In addition, the implementation of this invention will have minimal impact or changes on existing one-way cable systems.

This invention utilizes the two-way cable set-top-boxes and cable modems that are being manufactured and distributed to customers of two-way cable systems. The two-way cable devices are used with this invention to pass request information upstream, out of the house and onto the local distribution network. These upstream request signals are received and collected at a local upstream hub where they are retransmitted over an alternate communication path such as a satellite link, terrestrial wireless, or telephone line (POTS, ISDN, T1, etc.). The local upstream hubs will be located at the junction point of several branches in the distribution chain, prior to any of the cable hardware that precludes two-way operation such as distributor amplifiers. In this manner, one local upstream hub center can service several dozen households or more depending on the density of the households served and the structure of the cable system. The use of this invention bypasses the main cable trunk and most of the distribution system, therefore alleviating the need for upgrading to a two-way system.

Data security (e.g., encryption, etc.) may be handled over the combination of the backlink and broadcast channels or by occasional calls (via modem) to the cable provider to update security parameters (e.g., keys, passwords, etc.)

BRIEF DESCRIPTION OF THE DRAWINGS

The above and other objects, advantages and features of the invention will become more apparent when considered with the following description and accompanying drawing wherein.

DETAILED DESCRIPTION OF THE INVENTION

Figure 1:
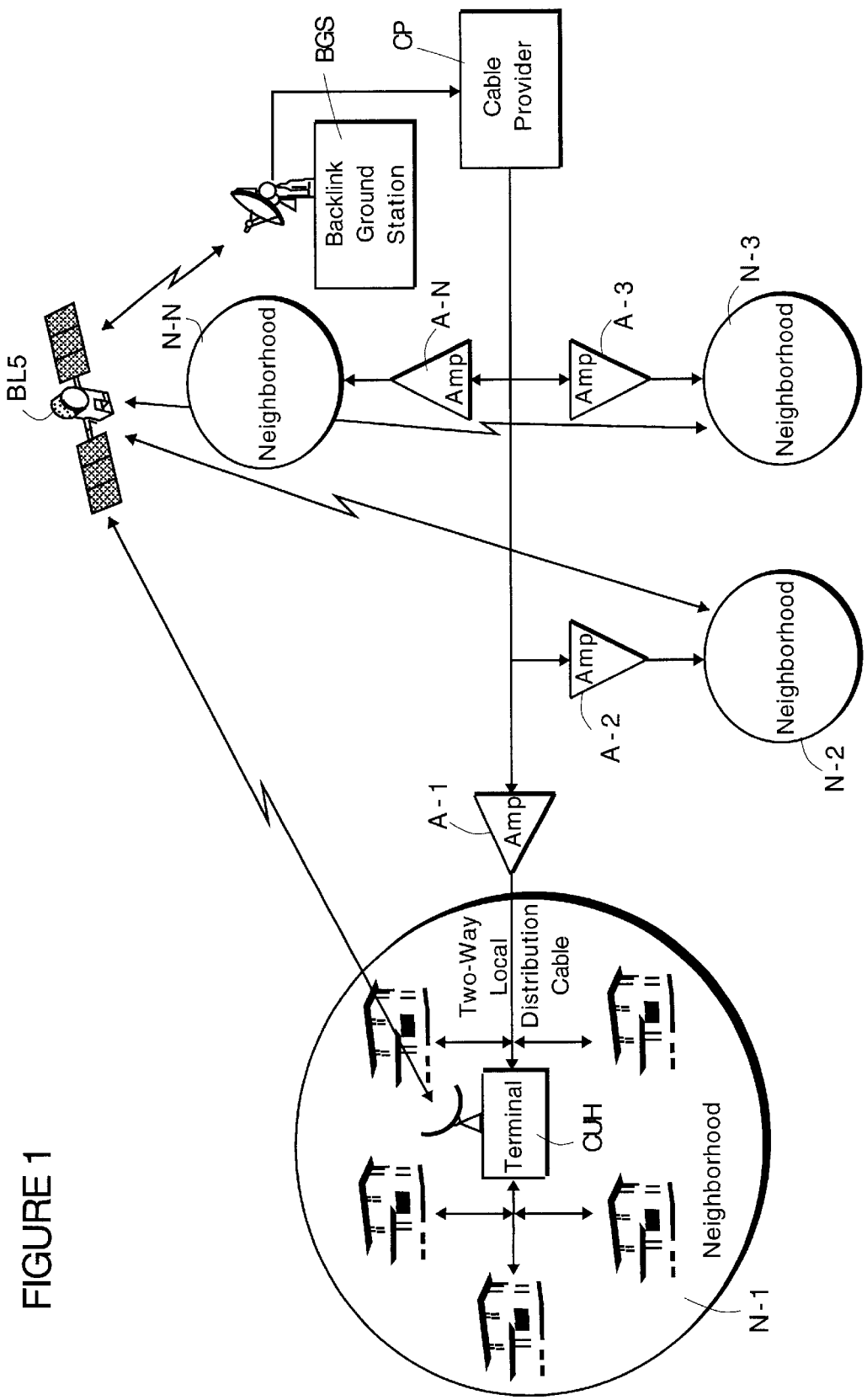
FIG. 1 is a general block diagram of the invention using a satellite backlink.

A summary of the invention using a satellite backlink as an example is shown in FIG. 1. Each neighborhood N1, N2, N3 . . . NN is connected via amplifiers A1, A2, A3 . . . AN by the one-way trunk and distribution network and each neighborhood is serviced by an individual local upstream hub terminal LUH which communicates with the backlink satellite BS's to send request messages back to the cable provider via backlink ground station BGS. A telephone line could also be used to link the terminal to the cable provider.

Figure 2:
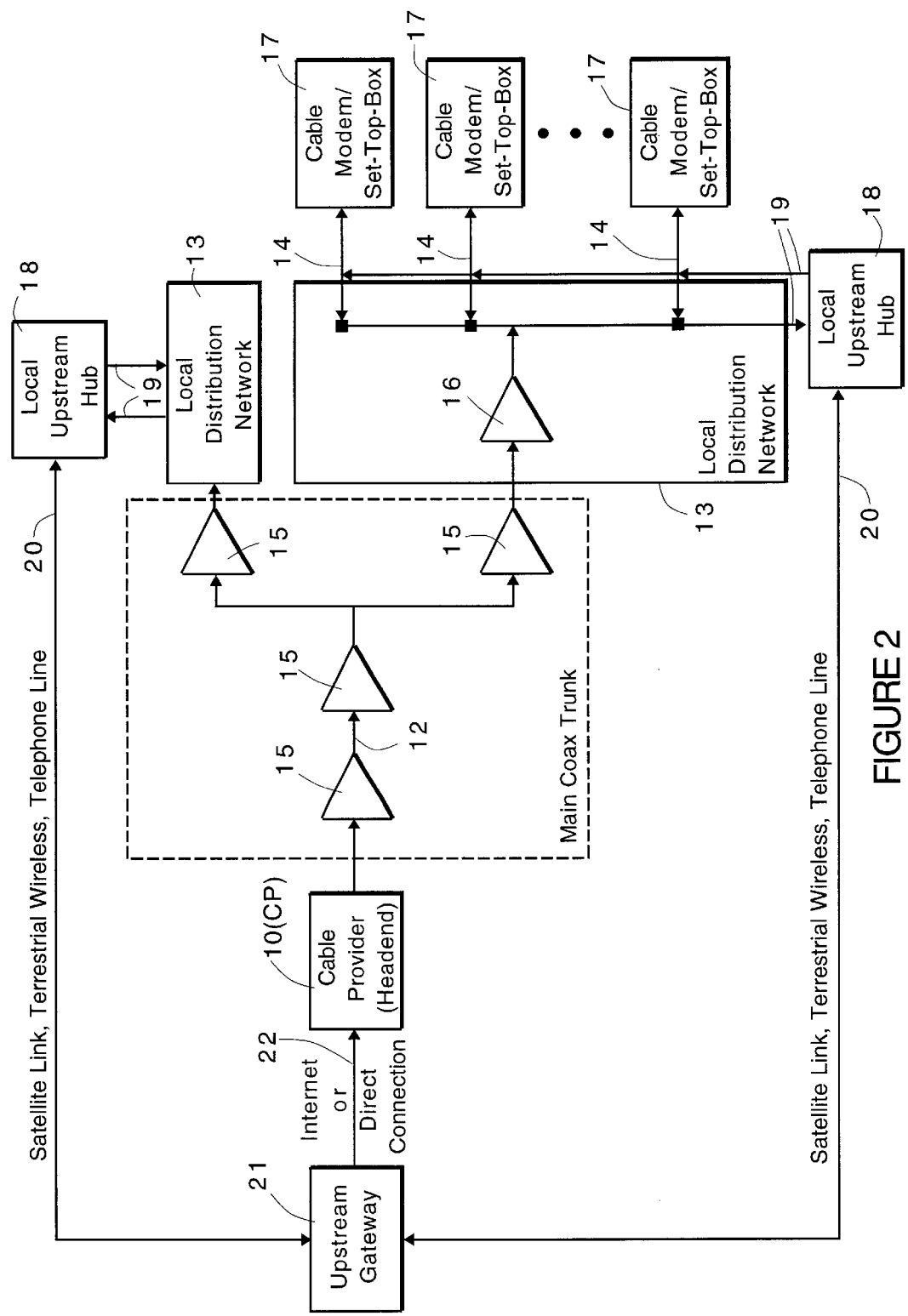
FIG. 2 is a block diagram of an alternate upstream channel.

As shown in FIG. 2, this invention integrates with the existing cable system which can be described as follows: The cable provider 10 continually broadcast broadband video and data to all users through the main, coaxial trunk 12, the local distribution network 13, and the subscriber drops 14. The broadband signal is amplified along the way by trunk amplifiers 15 in the trunk system and by distributor amplifiers 16 while in the distribution network. The signals are then received by the users at the cable modems or set-top-boxes 17.

According to the invention, users enter upstream data/video/service requests to the cable modems or set-top-boxes 17 which are set up as modem and controller two-way devices. The upstream requests would travel up the local distribution network 13 where they would be blocked from progressing further upstream into the distribution and trunk systems by the one-way amplifiers 15 and 16. The signals would, however, proceed to the local upstream hub 18 which would be connected in the distribution chain so that there were no one-way amplifiers between it and the households that it would service. Control signals 10 would also be sent from the local upstream hub to the cable modem/set-top-boxes in its network if they are needed, and cable modem/set-top-boxes are compatible to receive commands. Depending on the multiple access scheme used, the local upstream hub could re-transmit each individual signal or multiplex them on a common signal on an alternative communication path.

The local upstream hub 18 is a demodulator (for upstream signals from STB and modems) and a transmitter (for concentrated request signals) that uses an alternative communications path 20 than the cable system described above. The alternative communication path 20 could be a satellite link, a terrestrial radio link (cellular, microwave, etc.), or a wired telephone line. The local upstream hub transmits the upstream request to the upstream gateway 21 which would be a different facility depending on the communication path that is used. For example, if the path 20 is a satellite link, the upstream gateway 21 could be collocated with the cable headend or located at a satellite ground terminal. If, however, the path 20 were a telephone line, the upstream gate 21 could simply be a bank of modems located at the cable headend 10. The communication path 19 between the local upstream hub 18 and the upstream gateway 21 could be a two-way link in order to accommodate greater operations flexibility or a one-way link to reduce system cost.

The upstream gateway 21 is used to deliver the upstream requests to the cable headend provider 10. The transfer of the requests 22 can be via Internet, over a direct telephone linkage, a dial-up telephone linkage or other data transfer method. The upstream gateway 21 can also send messages directly to their intended destinations (e.g., Internet, third-party vendor, etc.) instead of relaying all messages through the cable provider 10.

Figure 3:
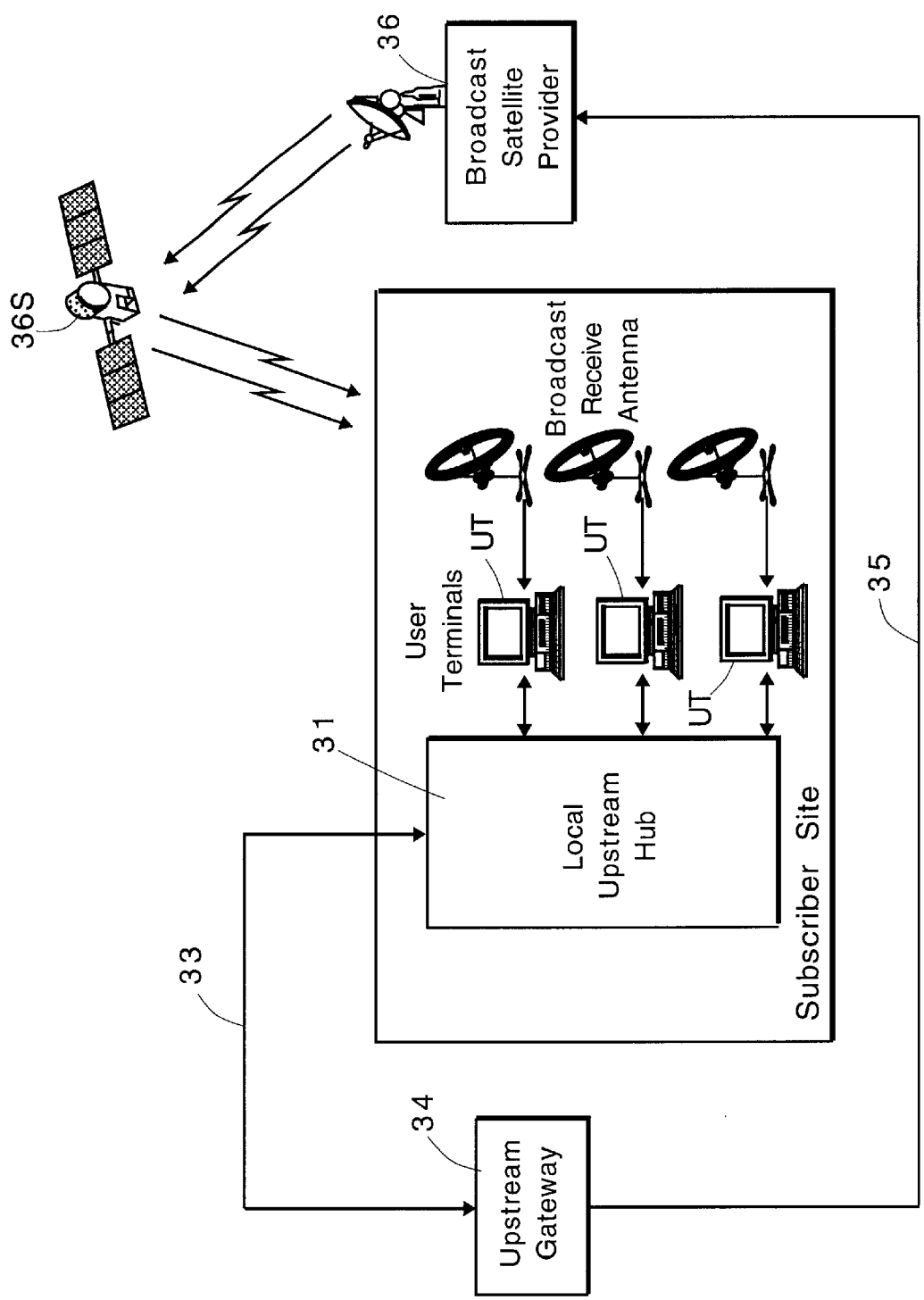
FIG. 3 is a schematic block diagram of an upstream channel for direct broadcast satellites (DB's)

As shown in FIG. 3, the local upstream hub 31 can be used for data/video/service requests for satellite broadcast as well. In this embodiment, the user terminals UT send requests to a central local upstream hub 31 (by a local telephone call, or another wireless or wired link). The request would be relayed over an alternative communication path 33 (satellite link, wireless terrestrial ink, or telephone line) to the upstream gateway 34. The upstream gateway 34 would then send the request via path 35 on to the broadcast satellite provider 36. The broadcast satellite provider 35 would get the request and send a reply via the broadcast satellite 36 back to the user's terminal. The same process would apply whether the terminal is a PC or a television.

Figure 4:
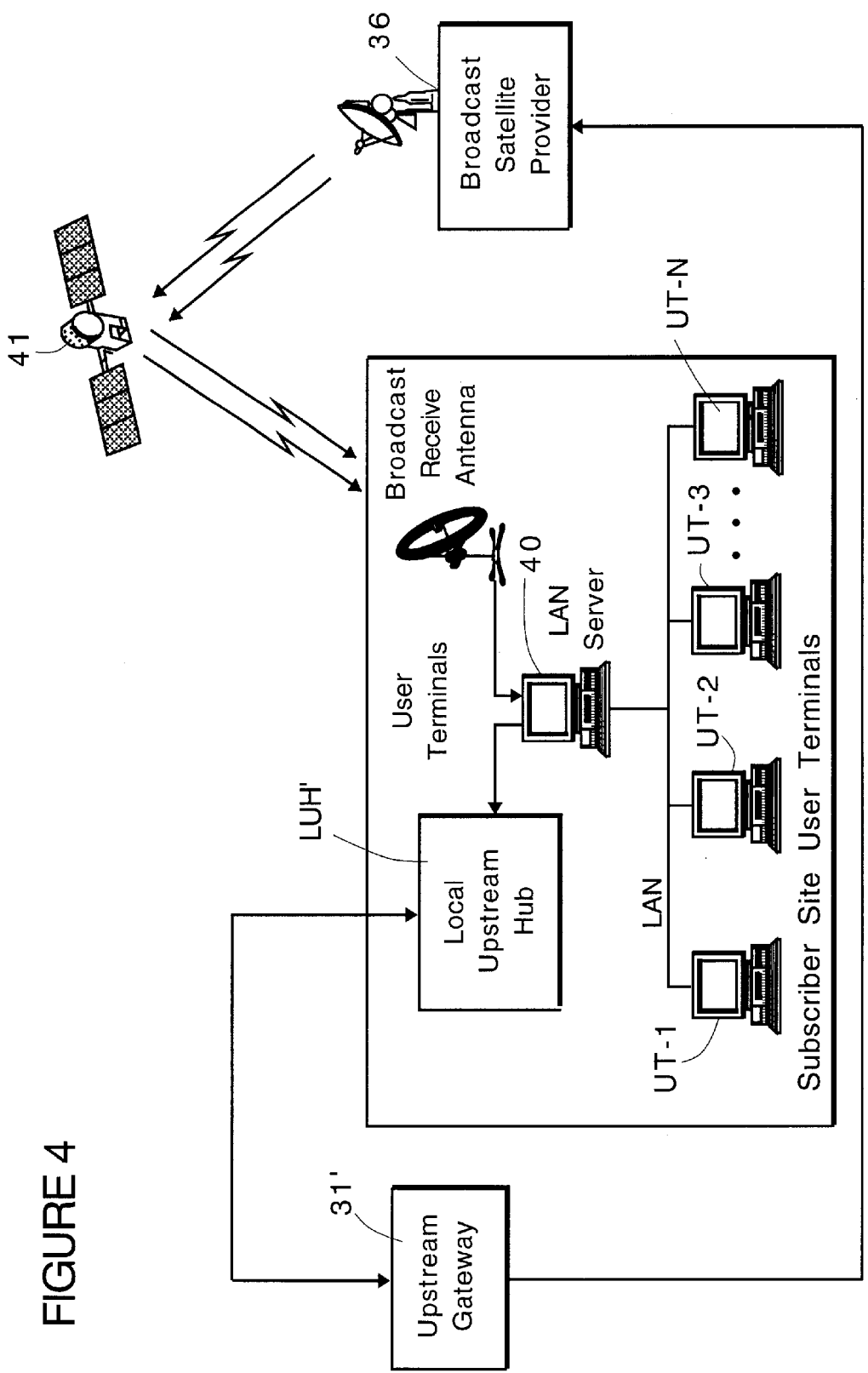
FIG. 4 is a schematic block diagram of an upstream channel for a LAN/service configuration and direct broadcast satellite.

As shown in FIG. 4, the local upstream hub (LUH') can also be used in a server/LAN 40 configuration where a single one-way data source 41 (e.g. satellite broadcast, cable, etc.) is provided to a server which is connected to a number of users UT-1, UT-2, UT-3 . . . UT-N. All of the request messages from the users would be routed through the LAN to the server 40, which in turn would route the messages via the local upstream hub, LUH', to the upstream gateway 31'.

Figure 5:
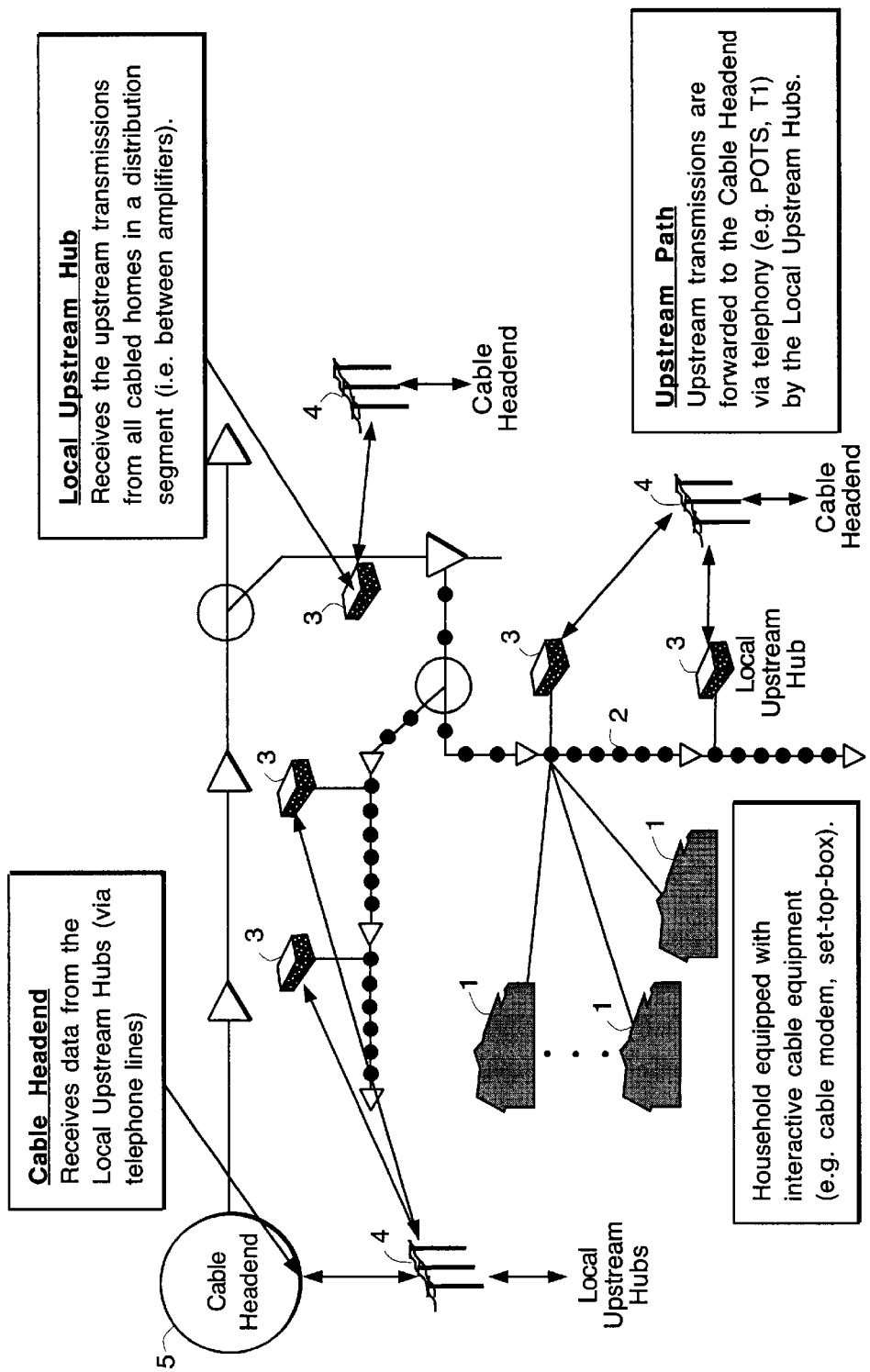
FIG. 5 is a general block diagram of a cable system with a telephone line upstream channel (e.g. POTS, T1)

FIG. 5 shows a one-way cable system utilizing the local upstream hubs with telephone lines (e.g. POTS, T1) serving as the upstream path. A household 1 (equipped with two-way cable devices) sends a message upstream onto its cable distribution segment 2. The message is received at the distribution segment's distribution segment 2. The message is received at the distribution segment's local upstream hub 3 and reformatted for transmission over the specific telephone path 4 that it is connected with (e.g. POTS, T1). The upstream message is sent over the telephone path 4 to the cable headend 5 where it is received and sent to its ultimate destination (e.g. internet, billing, independent third party).

Setup (or re-programming) of the local upstream hub 3 can be performed by two possible means.

(1) The local upstream hub 3 could be capable of demodulating downstream data traffic from the cable headend 5 and any data transfers to an individual local upstream hub 3 can be done via the downstream cable signal.

(2) The local upstream hub's connection with the telephone path could be a two-way connection so that the cable headend 5 could send data transfers over the telephone path to each individual local upstream hub 3.

The invention features the following:

1. A device (the local upstream hub) that is connected to a one-way cable system and allows users to request data/video and other services over their cable modems/set-top-boxes as if they had access to a two-way cable system.
2. The local upstream hub could also be used with a group of satellite broadcast users as well as cable users.
3. The local upstream hub would receive all of the user requests within a designated cluster, concentrate the requests into one or more shared channels, and relay them to the cable provider over an alternative communication path.
4. Alternative communication paths for the local upstream hub could be, but are not limited to, a satellite link, a terrestrial wireless system link, or a wired telephone link.
5. The local upstream hub would be located in a portion of the cable distribution system where it can receive upstream communications from two-way devices in its local area.
6. In order to increase the number of users which access a single local upstream hub, two-way amplifiers could be installed in the cable distribution chain to increase the accessible cable modems/set-to-boxes, and local upstream hubs can "listen" for two-way devices that can pass upstream messages through downstream amplifiers in the distribution chain.
7. Local upstream hub could provide some form of packet acknowledgements or collision detection signals back to the cable modem/set-top-box (this will be driven by the cable modem standards).
8. The upstream gateway could send data to the cable provider via an Internet connection, over a direct wired telephone link, or through other means.
9. The upstream gateway could forward data directly to other service providers (e.g. home shopping or an Internet website que) rather than having the data always go to the cable (or broadcast) provider first.
10. The local upstream hub would multiplex (i.e., concentrate) user requests onto one or more channel(s) to the upstream gateway to achieve high-channel efficiency.
11. The local upstream hub could be used in a server/LAN configuration where several users were serviced by a common one-way data source and a single local upstream hub.

Figure 6:
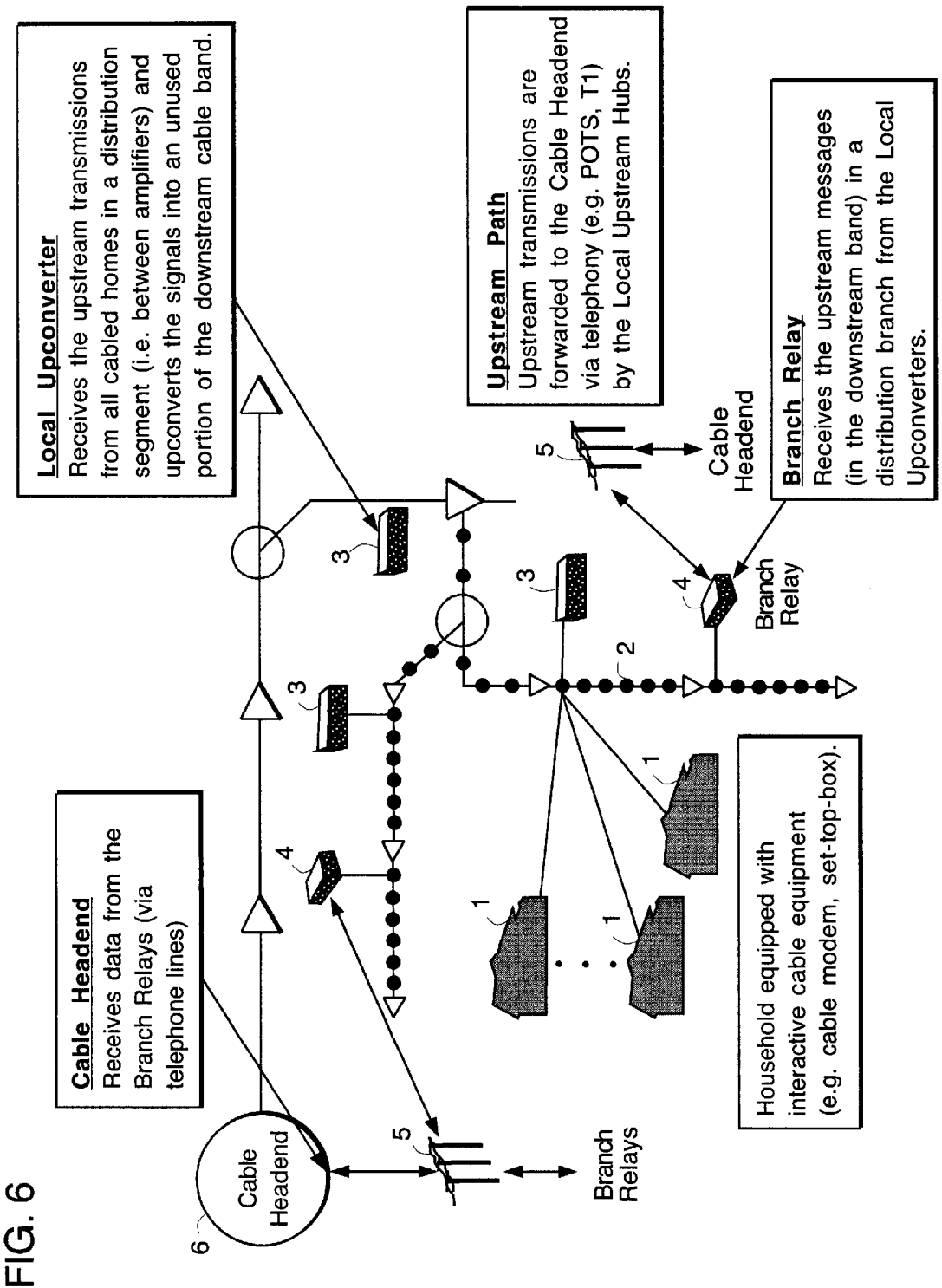
FIG. 6 shows an embodiment of the invention wherein most of the local upstream hubs are replaced with local upconverters.

FIG. 6 shows a variation of the invention where most of the local upstream hubs are replaced with local upconverters. In this configuration, two-way interactive cable devices in local households 1 send upstream messages (in the upstream cable frequency band) into their local distribution branch 2. A local upconverter 3 receives the message and upconverts it to an unused portion of the downstream cable frequency band. The message is then retransmitted into the distribution branch 2 where it propagates through distribution amplifiers to a branch relay 4. The branch relays 4 receive the upstream messages from the downstream cable frequency band and forwards them to the cable headend 6 via an alternative path 5 (e.g. POTS, ISDN, T1).

While preferred embodiments of the invention have been shown and described, it will be apparent to those skilled in the art that other embodiments, adaptations and modifications are possible.

What is claimed is:

1. In an interactive cable broadcast network in which a central headend station is connected by a one-way main coaxial trunk cable to two-way coaxial distribution cables in subscriber neighborhoods and to individual subscriber stations by subscriber station drops to the subscriber's terminal equipment, the improvement comprising, each subscriber station having an interactive two-way cable set top box, a neighborhood centered backhaul hub unit connected to each interactive two-way set top box in a given neighborhood for receiving request signals from each said interactive two-way set top box in said given neighborhood and concentrating said request signals in one or more shared channels, said neighborhood centered backhaul hub unit being adapted for data/video/service requests broadcast from a satellite, each said interactive two-way set top box being adapted to send a request signal to said neighborhood centered backhaul hub unit, an upstream gateway unit being adapted to send the requests via a broadcast satellite provider to said subscriber stations, and a two-way satellite communication link, independent of said trunk cable and distribution cables, connecting each neighborhood centered backhaul hub unit to said central headend station for forwarding said request signals to said central headend station.

2. In an interactive cable broadcast network in which a central headend station is connected by a one-way main coaxial trunk cable to two-way coaxial distribution cables in subscriber neighborhoods and to individual subscriber stations by subscriber station drops to a subscriber's terminal equipment, the improvement comprising, each subscriber station having an interactive two-way cable set top box, a neighborhood centered backhaul hub unit connected to each interactive two-way set top box in a given neighborhood for receiving request signals from each said interactive two-way set top box in said given neighborhood, said neighborhood centered backhaul hub unit including a server local area network (LAN) configuration whereby a single one-way data source constitutes a server connected to a plurality of subscriber stations and all of the request signals from said subscriber stations are routed through LANs to a server which in turn route said request signals via said neighborhood centered backhaul hub unit to an upstream gateway, and a two-way satellite communication link, independent of said trunk cable and distribution cables, connecting each neighborhood centered backhaul hub unit to a central headend station for forwarding said request signals to said central headend station.

\* \* \* \* \*